Dec. 3, 1968  W. WERDENBERG  3,413,792
PROCESS AND APPARATUS FOR THE MANUFACTURE OF CONCENTRIC
CONDUCTORS FOR ELECTRIC CABLES
Filed April 21, 1967

United States Patent Office 3,413,792
Patented Dec. 3, 1968

3,413,792
PROCESS AND APPARATUS FOR THE MANUFACTURE OF CONCENTRIC CONDUCTORS FOR ELECTRIC CABLES
Wilhelm Werdenberg, Saint-Prex, Switzerland, assignor to Societe Anonyme des Cableries et Trefileries de Cossonnay, Vaud, Switzerland, a Swiss company
Filed Apr. 21, 1967, Ser. No. 632,640
Claims priority, application Switzerland, May 4, 1966, 6,566/66
6 Claims. (Cl. 57—9)

ABSTRACT OF THE DISCLOSURE

A process in which straight wires are pulled by the moving cable between cogged rollers thereby becoming corrugated. The corrugated wires are guided between two cylindrical rings surrounding the core, in such a manner that each plane of the corrugation comes to lie in one of the tangential planes of the cable. The corrugated wires are distributed and thus disposed regularly by means of channels on the circumference of the core in an even-phase as possible on the surface of the cable by means of a nipple hole surrounding the core together with the concentric conductor. The wires are held firmly in position on the cable by wrapping material around the wires. An apparatus which includes cogged rollers, means for drawing wires, two cylindrical rings, channels disposed on at least one of said rings, and a nipple having a hole. The cogged rollers, cylindrical rings, channels and nipple are disposed one after another in the direction of forward movement of the cable.

The present invention is concerned with a process and an apparatus for the manufacture of a concentric conductor having corrugated wires covering a core bundle or one individual core, wherein the largest amplitudes of the corrugation of each wire are smaller than the bending radius of the section of the cable.

The metal sheath protecting electric cables is often used as a conductor for the transmission of energy, or else a conductor, commonly placed inside the cable, is replaced by a concentric outer conductor. In both cases the purpose is to reduce the price of the cable. These conductors disposed on the outside of the cable have the disadvantage that they have to be cut off when branchings of the inner conductors have to be made, unless the outer conductor is specially constructed or made of light material, which can be slit in a special way, which is just not possible with copper. That is why it was proposed a long time ago, amongst other features, to manufacture outer conductors of corrugated wires, in order that it be possible to stretch them at the place of branching of the cable and thus to permit reaching the inner conductors. The manufacture of such outer conductors of corrugated wires requires a special process and machinery, which have until now been either inadequate or complicated or not efficient enough, or only applicable to a definite kind of cable.

The object of the present invention is a process and an apparatus allowing in an especially simple and reliable manner, applicable to all kinds of cables and all usual conductor sizes, the manufacture of outer conductors constituted by corrugated wires, in desired lengths, which are brought side by side around the laid-up inner cores in the direction of the axis of the cable, in one or several layers under the usual cable sheath, wherein the number and section of the wires can be chosen so that the total section of one layer of the outer conductor at least corresponds to the section of one of the inner conductors, and wherein the form of the corrugation can be freely chosen, and so far as desirable even the corrugation can be reduced at certain places of the cable. As usual the form of the corrugation is chosen so that the corrugated wire adapts itself to the curve of the core bundle without difficulty and so that the relation of the amplitude to the length of the corrugation is such that at the site of a cable branching the accessible length of the outer conductor is sufficient to bend the wires aside, after they have been stretched far enough so that the inner conductors can be easily reached. The corrugation can be made less pronounced where there is no need to reach the inner conductors, or can even be omitted, to economise material for example, or to reduce the electrical resistance of the outer conductor.

For this purpose, the process according to the invention comprises pulling straight wires forward by the moving cable between cogged rollers and thereby corrugating the wires, guiding the corrugated wires between two cylindrical rings surrounding the core bundle or the single core, in such a manner that each plane of the corrugation comes to lie in one of the tangential planes of the cable, distributing the corrugated wires thus disposed regularly by means of canals on the circumference of the core bundle or the single core, keeping the so arranged wires as even-phase as possible on the surface of the cable by means of a usual nipple hole surrounding the core bundle or the single core together with the concentric conductor and holding the wires firmly in position on the cable by means covering wires or tapes or by a sheath of an extruded plastic material.

The apparatus for performing the process of the invention comprises in combination cogged rollers, means for drawing wires through said rollers, two cylindrical rings disposed with their center in the cable axis, channels disposed on at least one of said rings, and a nipple having a hole, said cogged rollers corresponding to the desired corrugation form, and being built together in pairs of such a width that several wires can be put side by side and pulled through, several pairs of rollers being arranged regularly and concentrically round the cable, said two cylindrical rings being displaceable in the cable axis amongst themselves and relative to the roller system during the manufacture, said channels being regularly placed on said ring and being at least as long as the length of the corrugation of the corrugated wire and at least as wide as twice the amplitude of the corrugation of the corrugated wires, the latter being displaced by said channels in the direction of the cable axis and around the cable axis, the nipple hole being displaceable relatively to the cylindrical rings and the rollers in the direction of the cable axis and said cogged rollers, cylindrical rings, channels and nipple being disposed one after another in the direction of forward movement of the cable.

Hereafter, special embodiments of the invention are described in detail, with reference to the accompanying drawing, in which.

Figure 1:
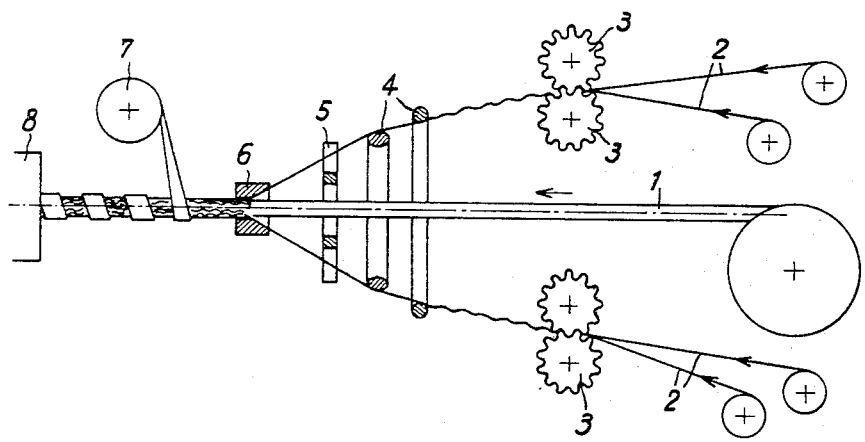
FIG. 1 shows a side view, partly cut off, of an apparatus.

The single wire 2 for building up the concentric outer conductor running from bobbins or coils is pulled through by the forward motion of the cable between two cogged rollers 3 corresponding to the desired form of the corrugation, and is thus corrugated. This corrugated wire, together with the other corrugated wires, then runs between two cylindrical rings 4 surrounding the cable, the position of which is chosen so that the corrugation plane of the wire takes a tangential direction to the section of the core bundle. By means of channels 5, concentrically distributed around the core bundle, the wires are then arranged uniformly around the circumference of the core bundle. The corrugated wires thus arranged are then drawn together in a given manner with the core bundle through a calibrated nipple hole 6 and kept there firmly around the core bundle 1 in such a manner that the layer of wires at the exit of the nipple hole 6 can be fixed by means of a covering material 7, e.g. textile fibres or metal tapes, or by means of extruded plastic material 8, e.g. polyvinylchloride or lead applied in the usual manner.

Figure 2:
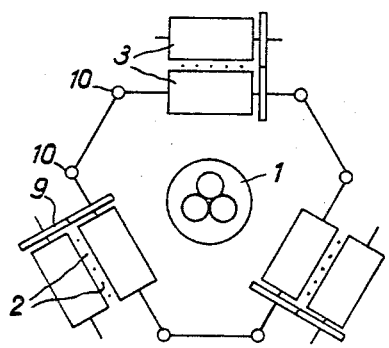
FIG. 2 shows rollers for corrugating straight wires.

To render the construction as simple as possible and to obtain the most even-phase and identical corrugation possible, which is important for a practical and economical construction of the outer conductor and of the finished cable, the wires are corugated simultaneously, while using the fewest possible pairs of rollers e.g. two to six, with the corresponding width. These are coupled together mechanically and in a definite manner, as schematically shown on FIG. 2. These couplings 9 and 10 can be cogged wheels 9 or guides in cross form or another suitable machine element. It is of advantage for the even-phase layer of the corrugated wires that the roller axes be arranged so that they lie parallel to the tangential plane of the core bundle 1 and that the pair of rollers be uniformly and concentrically placed around the core bundle, as schematically shown on FIG. 2 for three pairs of rollers.

To enable the alternation of the corrugation during the manufacture, the distance between the roller axes of a pair of rollers is adjustable, which allows a change of the amplitude until disappearance of the same. It must be taken for granted that the cogged rollers be mechanically coupled together in a definite manner.

The cylindrical rings are displaceable singly and together by usual means and are formed in such a manner that the plane of the corrugation can be brought gradually in to the desired position.

The channels disposed concentrically and uniformly around the core bundle are supported by a ring which is displaceable in the lengthwise direction of the core bundle and which may be turned round the core bundle, so that, if necessary, the channels can be put in the favourable place. This ring supporting the channels can be identical to one of the cylindrical rings 4. The length of the channels must be greater than the length of the corrugation of the wire, and the width of the channels must be at least twice the size of the amplitude of the corrugation of the wire.

To be able to use the same machinery, requirement for as many kinds of cables as possible, the rollers 3, the cylindrical rings 4, the ring supporting the channels 5 and the nipple hole 6 are constructed together as a transportable unit, which can be easily placed, thanks to its simplicity, in front of any desired spinning or extruding machinery.

I claim:

1. Process for the manufacture of a concentric conductor having corrugated wires covering a core, wherein the largest amplitudes of the corrugation of each wire are smaller than the bending radius of the section of the cable, comprising pulling straight wires forward by the moving cable between cogged rollers and thereby corrugating the wires, guiding the corrugated wires between two cylindrical rings surrounding the core, in such a manner that each plane of the corrugation comes to lie in one of the tangential planes of the cable, distributing the corrugated wires thus disposed regularly by means of channels on the circumference of the core, keeping the so arranged wires as even-phased as possible on the surface of the cable by means of a nipple hole surrounding the core together with the concentric conductor, and holding the wires firmly in position on the cable by wrapping material around said wires.

2. Process, according to claim 1, for change of the corrugation form during the manufacture of at least a part of the wires and on a least a part of the length, wherein the distance between the rollers of one pair of rollers is changed.

3. Apparatus for manufacturing a concentric conductor having corrugated wires covering a core of an electric cable, wherein the largest amplitudes of the corrugation of each wire are smaller than the bending radius of the section of the cable, said apparatus comprising in combination cogged rollers, means for drawing wires through said rollers, two cylindrical rings disposed with their center in the cable axis, channels disposed on at least one of said rings, and a nipple having a hole, said cogged rollers corresponding to the desired corrugation form, and being built together in pairs of such a width that several wires can be put side by side and pulled through, several pairs of rollers being arranged regularly and concentrically round the cable, said two cylindrical rings being displaceable in the cable axis amongst themselves and relative to the roller system during the manufacture, said channels being regularly placed on said ring and being at least as long as the length of the corrugation of the corrugated wire and at least as wide as twice the amplitude of the corrugation of the corrugated wires, the latter being displaceable by said channels in the direction of the cable axis and around the cable axis, the nipple hole being displaceable relatively to the cylindrical rings and the rollers in the direction of the cable axis, and said cogged rollers, cylindrical rings, channels and nipple being disposed one after another in the direction of forward movement of the cable.

4. Apparatus according to claim 3 for even-phase synchrone and identical corrugation of several wires, wherein said rollers of each roller pair and the roller pairs themselves are mechanically coupled together in a definite manner by means of machine elements.

5. Apparatus according to claim 3, for the simultaneous corrugation of several wires in a simple manner, wherein the axes of the rollers are disposed in planes which are parallel to the tangential planes of the surface of the cable.

6. Apparatus according to claim 3, for the change of the corrugation form during the manufacture, wherein the roller pairs of various roller forms are disposed regularly and concentrically one after the other so that by the variation of the distances of the rollers, one roller pair can be replaced by the next one during the manufatcure.

References Cited

UNITED STATES PATENTS

| | | | |
|---|---|---|---|
| 1,712,264 | 5/1929 | Gammeter | 57—9 |
| 1,808,444 | 6/1931 | Zapf | 57—9 |
| 1,823,886 | 9/1931 | Clark | 57—9 |
| 1,894,756 | 1/1933 | Clark | 57—9 |
| 1,942,218 | 1/1934 | Schmitz | 57—9 |

JOHN PETRAKES, *Primary Examiner.*